(12) United States Patent  
Kurita et al.

(10) Patent No.: US 6,690,543 B2
(45) Date of Patent: Feb. 10, 2004

(54) MAGNETIC DISK DRIVE WITH AIR BEARING SURFACE PAD ON MOVABLE PORTION AND METHOD OF CONTROLLING

(75) Inventors: Masayuki Kurita, Chiyoda (JP); Masaaki Matsumoto, Fujisawa (JP); Junguo Xu, Chiyoda (JP); Hidekazu Kohira, Ninomiya (JP); Yuuichi Ootani, Yokohama (JP); Hideaki Tanaka, Odawara (JP); Yoshihiko Miyake, Odawara (JP); Takeshi Harada, Abiko (JP)

(73) Assignee: Hitachi, Ltd., Tokyo (JP)

( * ) Notice: Subject to any disclaimer, the term of this patent is extended or adjusted under 35 U.S.C. 154(b) by 9 days.

(21) Appl. No.: 09/987,244

(22) Filed: Nov. 14, 2001

(65) Prior Publication Data

US 2002/0057532 A1 May 16, 2002

(30) Foreign Application Priority Data

Nov. 15, 2000 (JP) .......................................... 2000-352544

(51) Int. Cl.⁷ ............................. G11B 5/60; G11B 15/64; G11B 17/32; G11B 21/20; G11B 21/24; G11B 5/56

(52) U.S. Cl. .................................. 360/234.7; 360/294.7

(58) Field of Search ........................... 360/294.7, 294, 360/270, 240, 234.3, 234, 230, 235.4, 236.5, 234.7

(56) References Cited

U.S. PATENT DOCUMENTS

| 4,605,977 A | * | 8/1986 | Matthews ................. 360/234.7 |
| 5,943,189 A | * | 8/1999 | Boutaghou et al. ....... 360/234.7 |
| 6,057,987 A | * | 5/2000 | Furay et al. .............. 360/254.4 |
| 6,069,769 A | * | 5/2000 | Dorius et al. ............. 360/235.6 |
| 6,359,753 B1 | * | 3/2002 | Osaka et al. .............. 360/235.4 |

FOREIGN PATENT DOCUMENTS

| EP | 0242597 A2 | * | 10/1987 |
| JP | 62-250570 A | * | 10/1987 |

* cited by examiner

Primary Examiner—Julie Anne Watko
(74) Attorney, Agent, or Firm—Antonelli, Terry, Stout & Kraus, LLP

(57) ABSTRACT

Employed is a structure for moving by a micro-actuator not a read/write element but an air-bearing surface pad. The air-bearing surface pad is arranged nearer to the leading end than the read/write element. This arrangement allows the read/write element portion to have a sufficient size, making it possible to mount the currently used read/write element and associated wiring structure. The individual adjustment of a flying height leads to the increased recording density. Moving the read/write element away from the disk during loading/unloading operations can enhance reliability.

7 Claims, 11 Drawing Sheets

DIRECTION OF SLIDER MOVEMENT

DIRECTION OF DEFLECTION

FLYING HEIGHT AT PAD
$Hpc \fallingdotseq Hpa$

FLYING HEIGHT AT ELEMENT
$Hgc < Hga$

14

MAGNETIC DISK DRIVE WITH AIR BEARING SURFACE PAD ON MOVABLE PORTION AND METHOD OF CONTROLLING

BACKGROUND OF THE INVENTION

The present invention particularly relates to a slider structure for realizing an increased recording density of a magnetic disk drive.

A magnetic disk drive has a rotating magnetic disk and a magnetic head slider which has a read/write element mounted thereon and which is supported and positioned in a radial direction by a load beam. The slider runs relative to the disk to read and write magnetic information to and from the disk. The slider flies by an air wedge film effect serving as an air-lubricated bearing, and is kept from direct solid contact with the disk. In realizing a higher recording density and a resulting increased capacity or smaller size of the magnetic disk drive, it is effective to reduce a distance between the slider and the disk, i.e., a flying height of the slider.

In a design of the slider flying height, it is a conventional practice to provide a margin to allow for a possible reduction in the flying height caused by slider manufacturing variations and atmospheric pressure differences among environments where it is used. If this margin can be eliminated, the flying height of the read/write element can be reduced. To this end, a system has been proposed by, for instance, JP-62-250570A, in which a micro-actuator represented by a piezoelectric material is incorporated as a part of a slider to drive a read/write element and thereby individually and finely adjust the distance between the element and the disk. The system that controls the flying height of the read/write element by the micro-actuator as proposed in this official gazette is generally called an active head slider system.

A read/write element used in the existing products is separated into an inductive type write element and a read element utilizing a magnetoresistive (MR) effect, and they are formed by the photolithographic process at the trailing end of a slider, i.e., at the end face on the air discharge side. Near the read/write element are arranged positive/negative wires and pads for writing and for reading, i.e., a total of four wires and four wire pads.

The active head slider system proposed hitherto, though very effective in reducing the slider flying height, is inevitably more complex in slider structure than a rectangular parallelepiped slider of 1.25 mm length, 1 mm width and 0.3 mm height employed in the existing products. In addition to wires for the read/write element, wires for the micro-actuator are needed, making the wiring complex. Hence, it is difficult to secure the same space, 1 mm wide and 0.3 mm high, as in the existing magnetic disk drives at the air discharge end of the slider. The existing read/write element is therefore impossible or difficult to mount on the active head slider proposed hitherto.

BRIEF SUMMARY OF THE INVENTION

Unlike the conventional active head slider system in which the read/write element is driven by the micro-actuator, the active head slider according to the invention is characterized by a slider structure in which a flying pad on an air bearing surface (ABS) is driven by the micro-actuator. Another feature of this invention is that the movable ABS pad is situated on the leading side of the trailing end face on which the read/write element is mounted.

In the slider structure of this invention, two wires for driving the micro-actuator need only to be installed in another area which is separate from four wires for the read/write element and in which a sufficient space is available. This arrangement allows the slider to be made active while mounting the existing read/write element and wires thereon.

DETAILED DESCRIPTION OF THE INVENTION

An embodiment of the invention will be described in detail based on the accompanying drawings.

Figure 1:
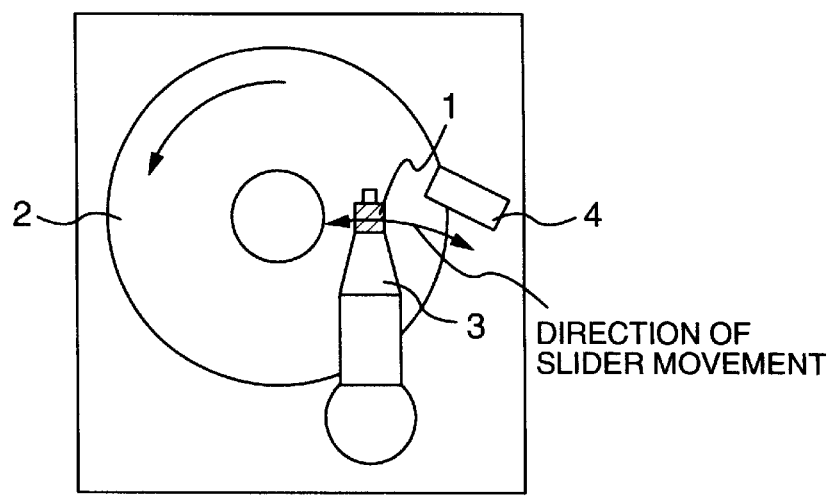
FIG. 1 is a schematic view of the construction of the magnetic disk drive according to an embodiment of the present invention.

The outline construction of the magnetic disk drive according to the embodiment of the invention is shown in FIG. 1. On a slider 1 is mounted a read/write element for reading and writing magnetic information. A magnetic disk 2 stores magnetic information and is rotated by a spindle motor not shown. The slider 1 is mounted to a load beam 3 shaped like a leaf spring which positions the slider 1 in the radial direction of the disk and at the same time applies a load to the slider to press it against the disk surface. The slider 1 is evacuated from above the disk 2 to above a ramp 4 before the drive is stopped or when no read/write command is given for a predetermined period of time. The slider 1 along with the load beam 3 performs a seek operation in the radial direction of the disk 2 as shown for reading and writing data over the entire disk surface. In this embodiment, the slider and its support mechanism perform a rotary motion for a radial seek operation. There are also mechanisms that perform a linear motion for the radial seek operation. The invention is applicable to either mechanism.

Figure 2:
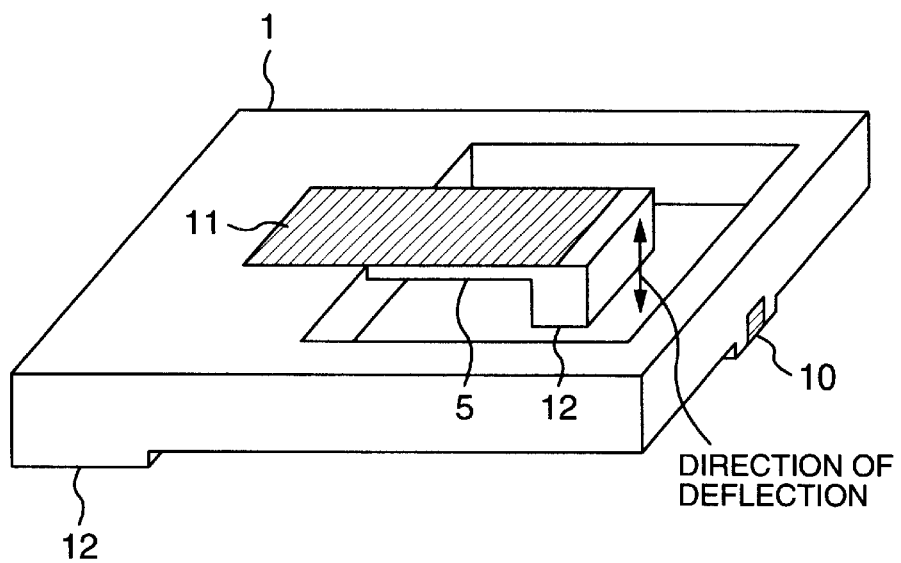
FIG. 2 is a perspective view showing a detail of a slider of FIG. 1.

FIG. 2 shows a perspective view of an embodiment of the slider. The slider of this embodiment is a movable-ABS-type active head slider, which has three ABS pads.

A body portion of the slider 1 (first slider) has at one end (an air discharge side end) thereof a read/write element 10 for reading and writing magnetic information to and from the magnetic disk and also an ABS pad 12 serving as a pneumatic bearing that uses an air flow to keep the slider 1 from coming into solid contact with the disk. Further, a part of the slider (a part on the air discharge side) is hollowed out to form a second slider 5 (intermediate slider). The second slider 5 has the ABS pad 12 at its free end and forms a kind of a micro-actuator structure which controls the flying height of the slider 1 by deflecting the second slider 5 in the direction of arrow. A deflection means 11 serving as a drive mechanism for displacing the second slider 5 in the directions of arrows shown is provided on that side of the second slider 5, which is opposite the surface facing the magnetic disk, to extend over the surface of the second slider and over a part of the slider body.

Because the ABS pad 12 is provided at the tip of the micro-actuator which is driven by the deflection means 11, the flying height of the slider body can be adjusted by moving the ABS pad 12 toward or away from the disk surface relative to the initial state of the ABS pad.

The read/write element 10 of this embodiment is divided into an inductive type write element and a read element utilizing a magnetoresistive effect. Although the read/write element 10 of this embodiment is formed by the lithography process, a similar effect can also be realized by using other types of read/write element.

The deflection means 11 of this embodiment is a unimorph type piezoelectric actuator which comprises a thin film of piezoelectric material, represented by lead zirconate titanate (PZT), and thin films of platinum sandwiching the piezoelectric thin film and serving as electrodes, all deposited in layers by sputtering on the slider base material. To facilitate the deformation in the directions of arrows, a recessed portion is formed at a boundary between the micro-actuator portion and the slider body portion by etching from the side opposite the piezoelectric thin film.

Applying a voltage between the electrodes causes the piezoelectric film to elongate in a direction perpendicular to the electric field. The surface of the slider base material on the piezoelectric film side is elongated due to the stretching by the piezoelectric film while the surface opposite the piezoelectric film is acted upon no external force and thus not elongated, resulting in the free end of the actuator deflecting downward in the figure. When the slider base material is made of silicon, the actuator is 0.6 mm long and 0.05 mm thick, and the PZT piezoelectric thin film is about 1 pin thick, the displacement of the free end of the actuator upon application of a voltage of 10 V is approximately 30 nm, large enough to adjust the flying height of the read/write element.

The effect of the invention can also be produced by using other piezoelectric thin film forming methods than the sputtering, such as a liquid-phase supply method called a sol-gel processing. Instead of forming the piezoelectric thin film on the base material, a layered piezoelectric thin film may be attached to the base material to produce a similar effect.

While in this embodiment a piezoelectric thin film is used as the deflection means 11, the deflection means 11 may be formed otherwise. For example, it may be fabricated in the form of a bimetal type actuator which has a plurality of layers with different thermal expansion coefficients and is deformed by thermal expansion from the resistance heat produced by electric current flowing through the actuator. Other possible forms of actuators include an electrostatic actuator and an electromagnetic actuator.

Next, the mechanism for changing the flying height of the read/write element in this embodiment will be explained by taking the slider structure of FIG. 2 as an example.

Figure 3:
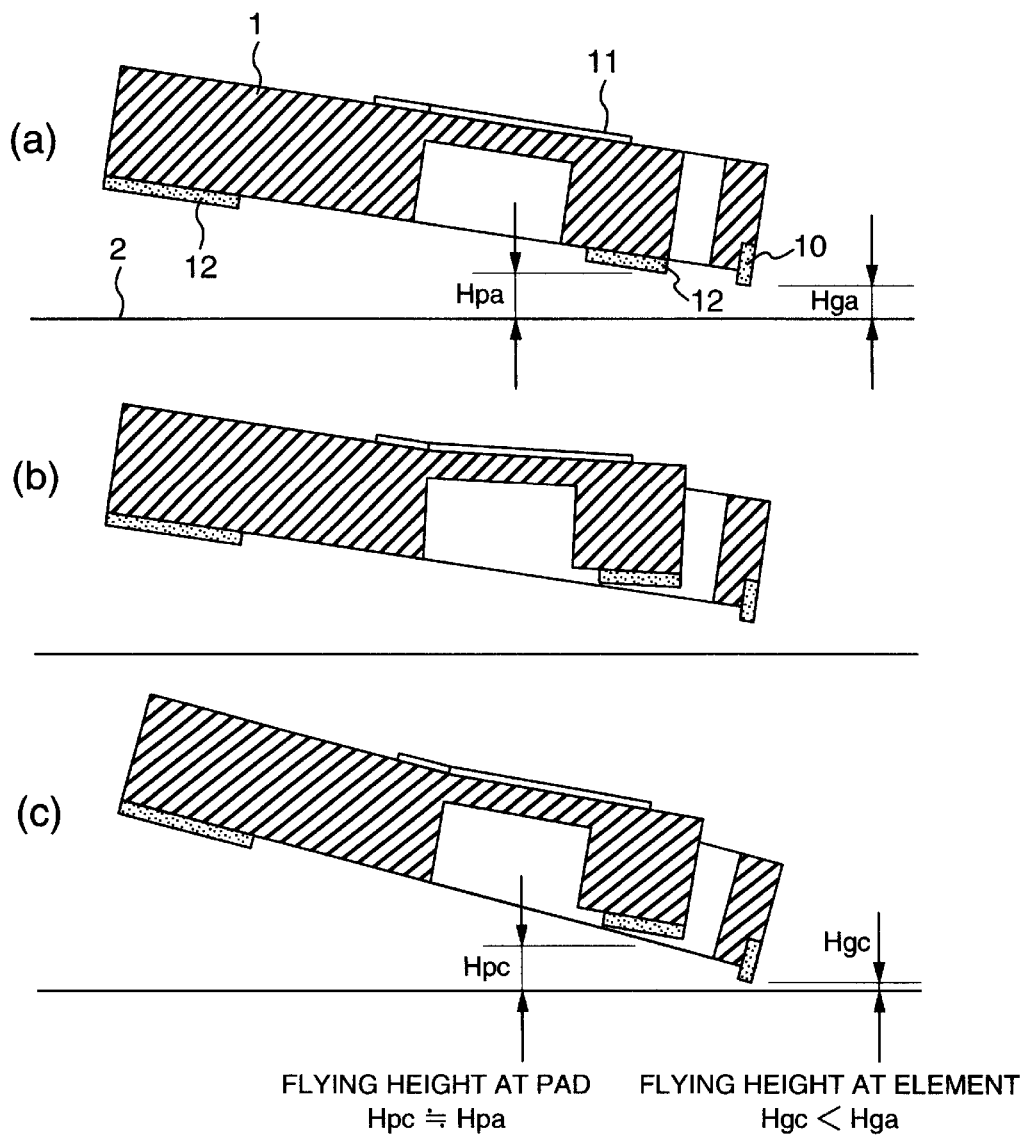
FIG. 3 is a conceptual diagram showing a mechanism of changing a flying height of a read/write element in the slider of FIG. 2.

FIG. 3 illustrates a mechanism for lowering the flying height of the read/write element portion in the active head slider of the embodiment shown in FIG. 2. FIG. 3(a) shows a state wherein the deflection means 11 is not applied an electric voltage and thus not deformed.

FIG. 3(b) shows a state wherein the deflection means 11 is applied a voltage and thus deformed upward. Under the condition that the load acting on the slider 1 is constant, the second slider in the state of FIG. 3(b) does not produce a sufficient air film pressure for supporting the load at its ABS pad 12. Thus, the slider 1 approaches the disk 2 until an air film pressure that balances with the load is produced. During this process the attitude angle of the slider 1 changes. That is, when the second slider is moved, the attitude angle of the slider 1 changes until the flying height of the pad 12 is equal to the initial flying height. A state wherein the load and the air film pressure produced balance each other is shown in FIG. 3(c). In FIG. 3(c), the flying height Hpc of the pad of the second slider is almost equal to the flying height Hpa at which the pad was when no deformation in the second slider, reducing a distance Hgc between the read/write element 10 and the disk 2 as compared with that of FIG. 3(a) (Hgc<Hga).

Figure 4:
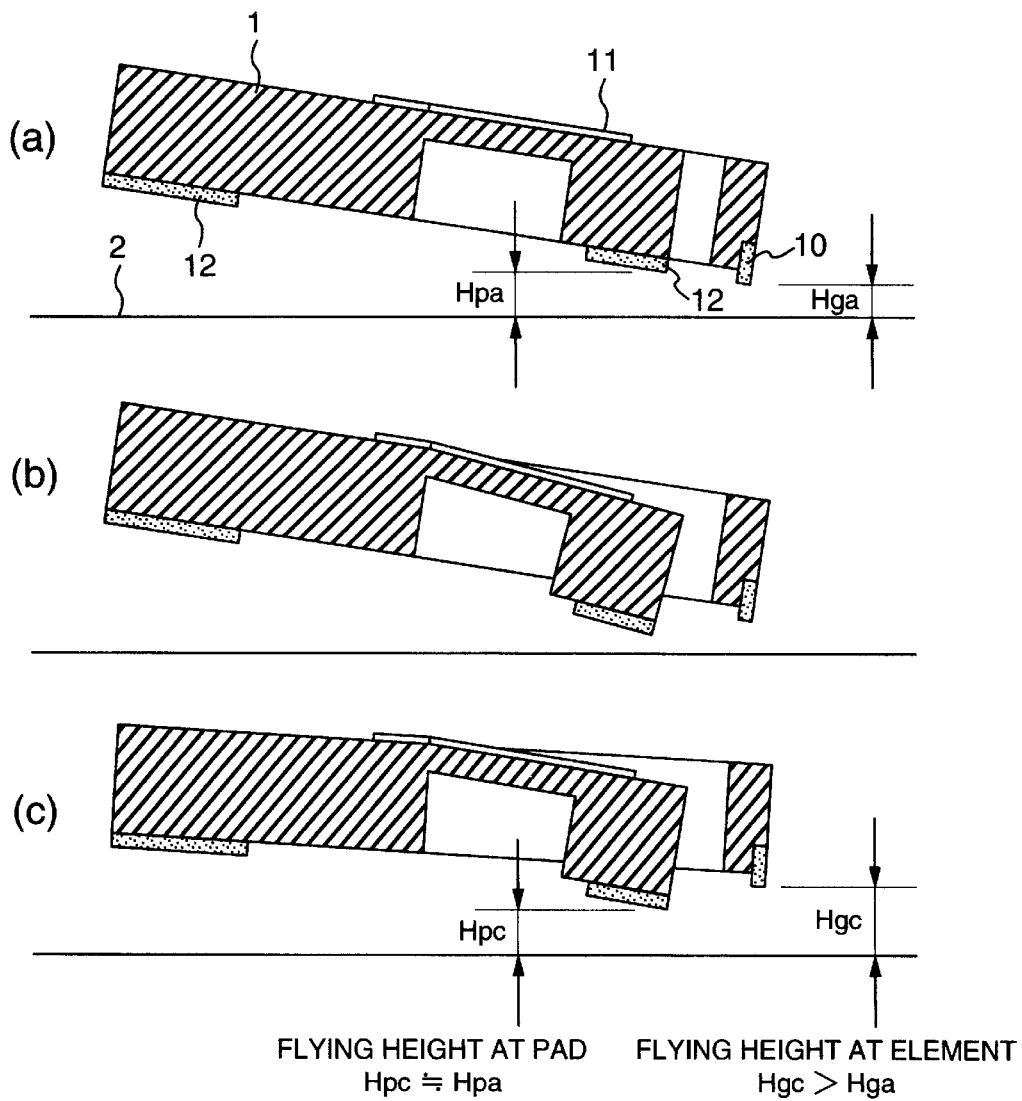
FIG. 4 is a conceptual diagram showing the mechanism of changing the flying height of the read/write element in the slider of FIG. 2.

FIG. 4 illustrates a mechanism for raising the flying height of the read/write element in the active head slider of the embodiment shown in FIG. 2. FIG. 4(a) shows a state wherein the deflection means 11 is not deformed.

FIG. 4(b) shows a state wherein the deflection means 11 is deflected downward. Under the condition that the load of the slider is constant, the second slider in the state of FIG. 4(b) produces an air film pressure at the ABS pad 12, which is excessive for supporting the load. Thus, the slider 1 as a whole moves away from the disk 2 until the air film pressure balances with the load. During this process, the slider attitude angle changes. That is, when the actuator is moved, the pad flying height Hpc becomes almost equal to Hpa, the flying height at which the pad was when no deformation in the actuator. FIG. 4(c) shows a state where the load and the air film pressure generated balance each other. In FIG. 4(c), the flying height of the second slider pad is almost equal to that when there is no deformation, increasing the distance between the read/write element 10 and the disk 2 as compared to that of FIG. 4(a) (Hgc>Hga).

As having described with reference to FIGS. 3 and 4, the flying height of the read/write element can be controlled by moving the ABS pad that has a great influence on the flying height, rather than directly moving the read/write element.

When compared with the conventional active head slider, the embodiment shown in FIG. 2 can use the entire end face of the slider on the air discharge side as a portion for installation of wires and wiring pads. In the construction of this embodiment, the slider may have the same dimension of 1 mm width and 0.3 mm height as the currently used pico-slider. This arrangement allows positive/negative wires and pads for writing and reading, i.e., a total of four wires and four wiring pads, to be formed at the end of the slider on the air discharge side. Wires for the micro-actuator may be installed at another portion where there is a sufficient space.

Because the same large area as that of the existing slider can be secured at the slider end on the air discharge side, positive/negative wires and pads for writing and reading and for the micro-actuator, i.e., a total of six wires and six wiring pads, may be formed at the slider end on the air discharge side.

Further, separating the read/write element from the micro-actuator has an effect that electric signals for driving the micro-actuator can be prevented from interfering with the read/write element.

The use of the read/write element and wiring arrangement not largely different from conventional ones allows early realization of an active head slider that can absorb machining variations and pressure differences by adjusting the flying height according to individual circumstances, and reduction of the flying height. During loading/unloading or when a zero gravity state due to falling of the drive is detected, the element portion can be moved away from the disk to prevent possible contact with the disk and thereby enhance reliability.

Another embodiment of the invention will be described with reference to FIG. 5.

Figure 5:
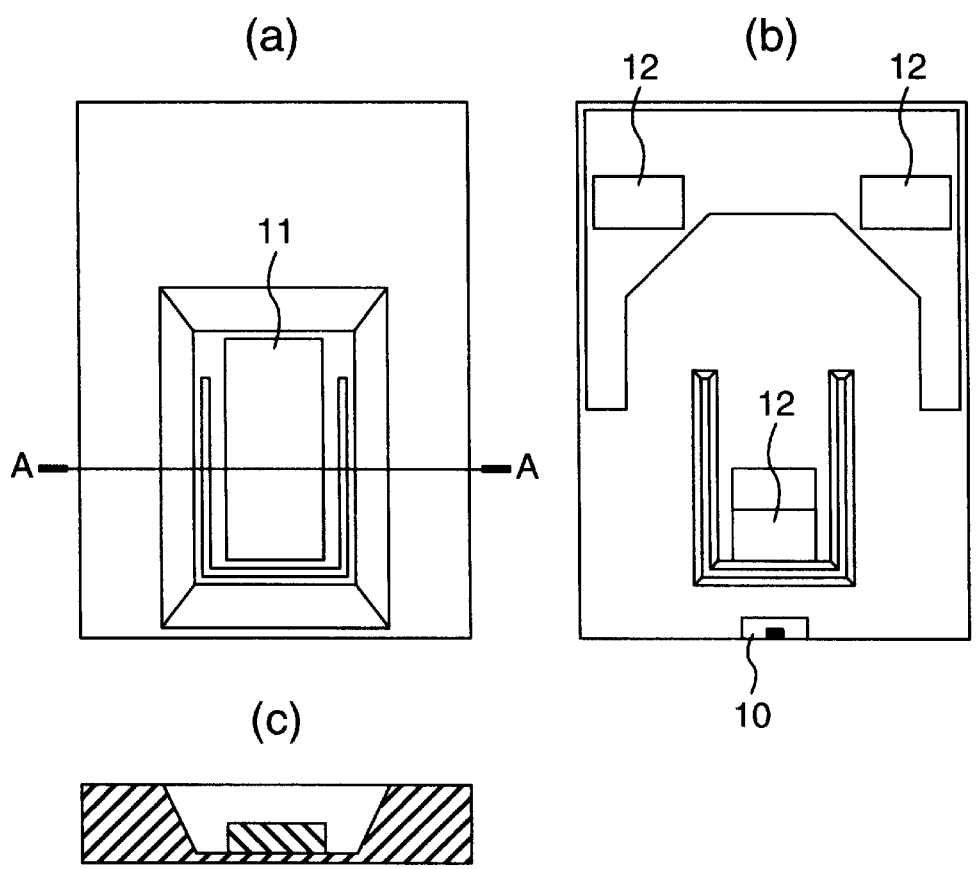
FIG. 5 shows a front view, a sectional side view and a rear view of another embodiment of the invention.

FIG. 5 shows another embodiment of the movable-ABS-type active head slider, which has three ABS pads illustrated in FIG. 2. Parts common to the embodiment of FIG. 2 are designated by the same reference numbers. Although the thin plate structure in FIG. 2 is realized by etching from the flying surface side, in this embodiment, etching is done from a side opposite the flying surface to form a thin plate structure, and a deflection means 11 such as PZT is bonded onto the thin plate structure. In the case of this embodiment, because the deflection means 11 is provided only on the second slider side, a higher voltage than that required in the embodiment of FIG. 2 needs to be applied in order to cause the deformation. To reduce the voltage to be applied, a notched groove may be formed in a portion of the slider where the deflection means 11 is provided.

This embodiment is also characterized in that, as compared with the conventional active head slider, the entire end face of the slider on the air discharge side is made available for use as a wire and wiring pad arrangement portion. The slider of this embodiment may also have the same dimension of 1 mm width and 0.3 mm height as the existing pico-slider.

Figure 6:
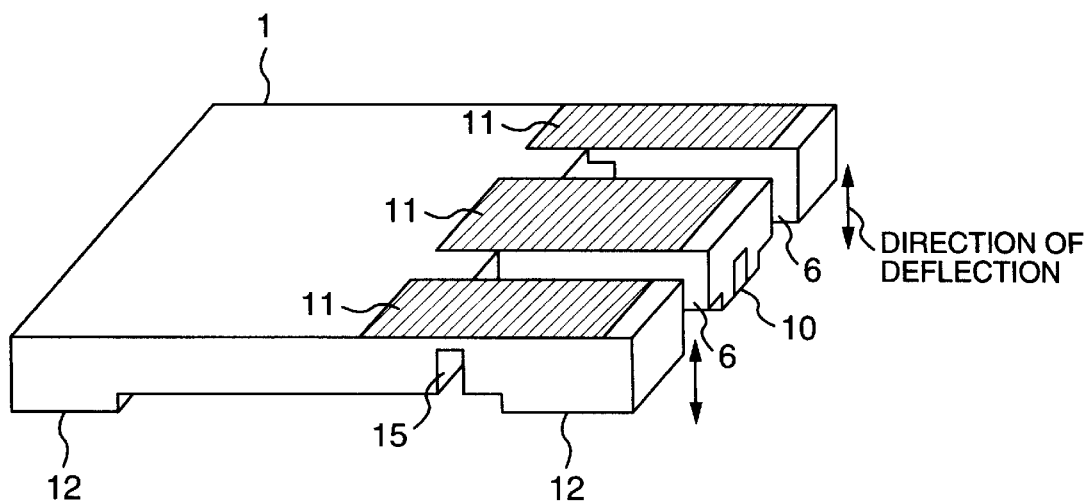
FIG. 6 is a perspective view of a slider of still another embodiment of the present invention.

FIG. 6 shows the movable-ABS-type active head slider structure, which has four ABS pads, according to a further embodiment of the invention. Parts identical with those of FIG. 2 are given the same reference numbers. In this embodiment, cuts 6 are formed on the air discharge side, which separate a central portion having a magnetic element 10 from both side portions each having an ABS pad, so that the read/write element portion and the ABS pad portions can move independently of each other. Further, a laterally extending groove 15 is formed in a portion between the side portions having the ABS pads and the slider body portion. The groove 15 thus formed from the air bearing surface side enables the deformation with a low voltage. Since the read/write element portion and the ABS pad portions can be independently driven, it is possible to first displace the read/write element portion away from the disk surface to secure a predetermined flying height and then bring it close to the disk surface. This keeps the read/write element portion from coming into direct contact with the disk surface, thereby prolonging the life span of the element.

Figure 7:
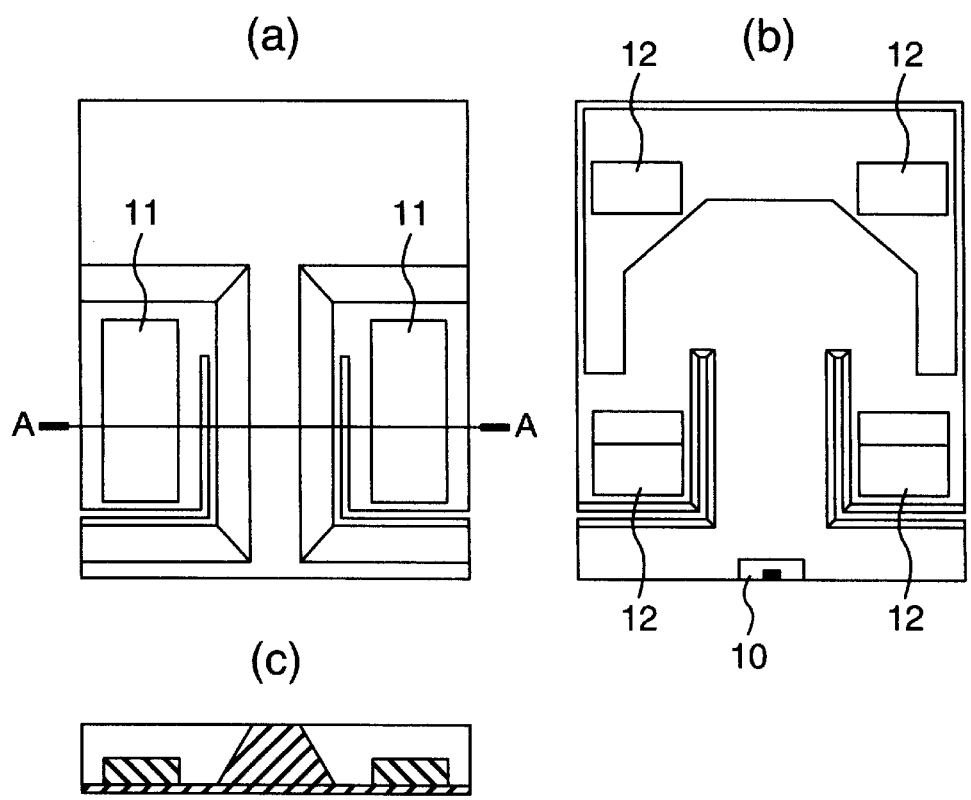
FIG. 7 shows a front view, a sectional side view and a rear view of a slider of a further embodiment of the invention.

FIG. 7 shows the movable-ABS-type active head slider structure, which has four ABS pads, according to a further embodiment of the invention. The same reference numbers are given to he same part as those in FIG. 2. This embodiment has ABS pads arranged nearer to the leading end of the slider than in the active head slider of FIG. 6 and makes the entire end face of the slider on the air discharge side available for use as a wire and wiring pad arrangement portion. The slider may also be sized to the same dimension of 1 mm width and 0.3 mm height as the existing pico-slider.

Next, for a slider having a plurality of actuators, as represented in FIG. 6, with one movable portion having a read/write element and the other movable portions having ABS pads, a method of controlling the flying height will be explained. The central moving portion having the read/write element 10 is not deformed though it has a capability of being deformed. It may, however, be deformed for moving the element portion away from the disk during unloading or when a zero gravity state as a result of falling is detected as described above. The two movable portions having the ABS pads on the both sides are deformed during normal reading and writing operations. This embodiment features, although the slider has a structure, for the reason of manufacturing, that allows the read/write element portion to be moved, not using the function of deflecting the element portion and moving the ABS pads instead to result in controlling the flying height of the read/write element portion. No operation of the actuator in the read/write element portion enables prevention of the noise caused by this actuator from adversely affecting the read/write signal.

Figure 8:
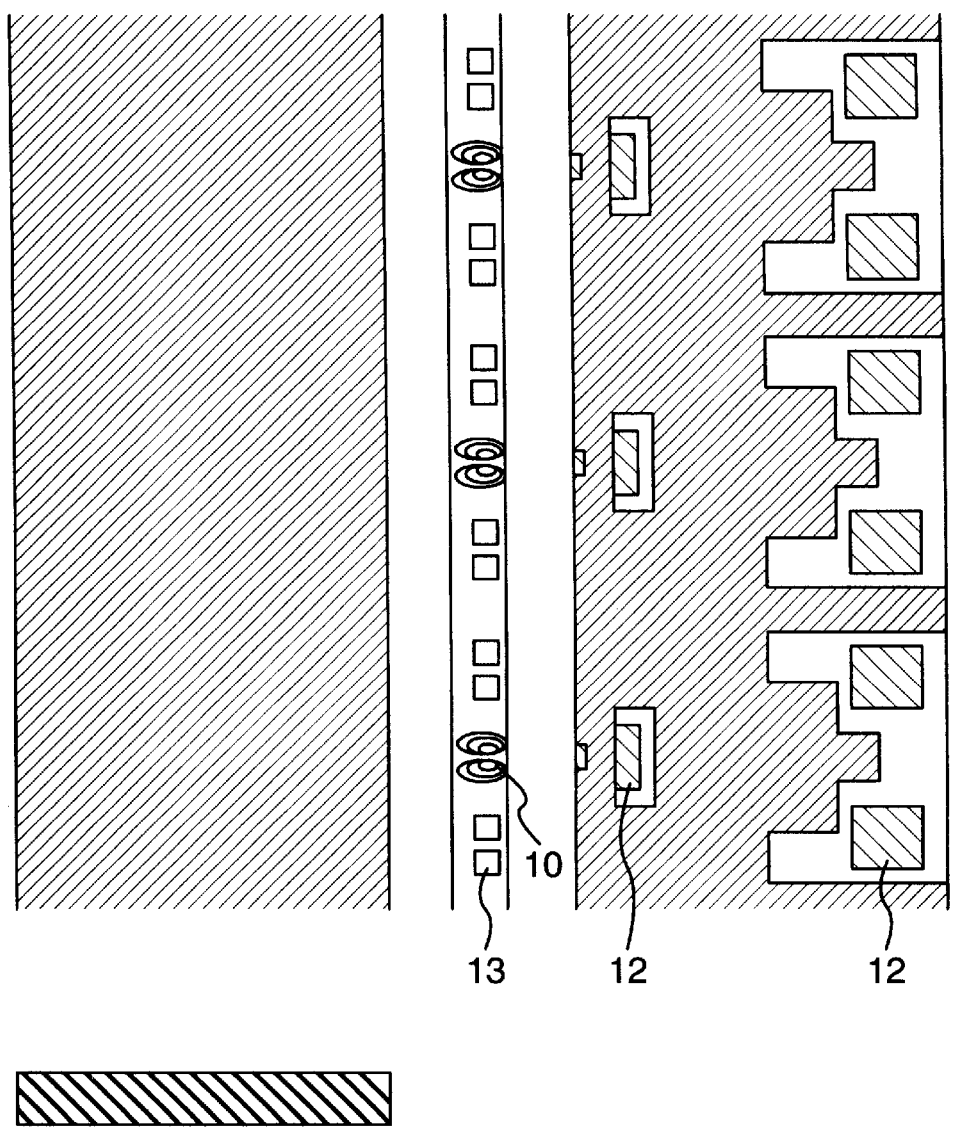
FIG. 8 shows views for explaining a process of fabricating the slider of FIG. 2.

FIG. 8 illustrates a concrete method of manufacturing the active head slider according to the embodiment of the invention shown in FIG. 2.

First, a plurality of read/write elements 10 are formed simultaneously at predetermined locations on a wafer. This surface constitutes the end face of each slider on the air discharge side. Forming wiring pads 13 around the read/write elements facilitates the wire connection to a suspension. The wafer may be made from alumina and titanium carbide similarly to the conventional sliders or from single crystal silicon which can be easily etched.

Then, the wafer is sliced into bars, in each of which the read/write elements are arranged in line. Subsequently, ABS pads 12 are formed by an etching technique such as ion milling. The etching may be either dry etching or wet etching using potassium hydroxide, as in the conventional slider processing method. FIG. 8 shows a front view, a side view, a rear view and a section view of the bar in this state.

Figure 9:
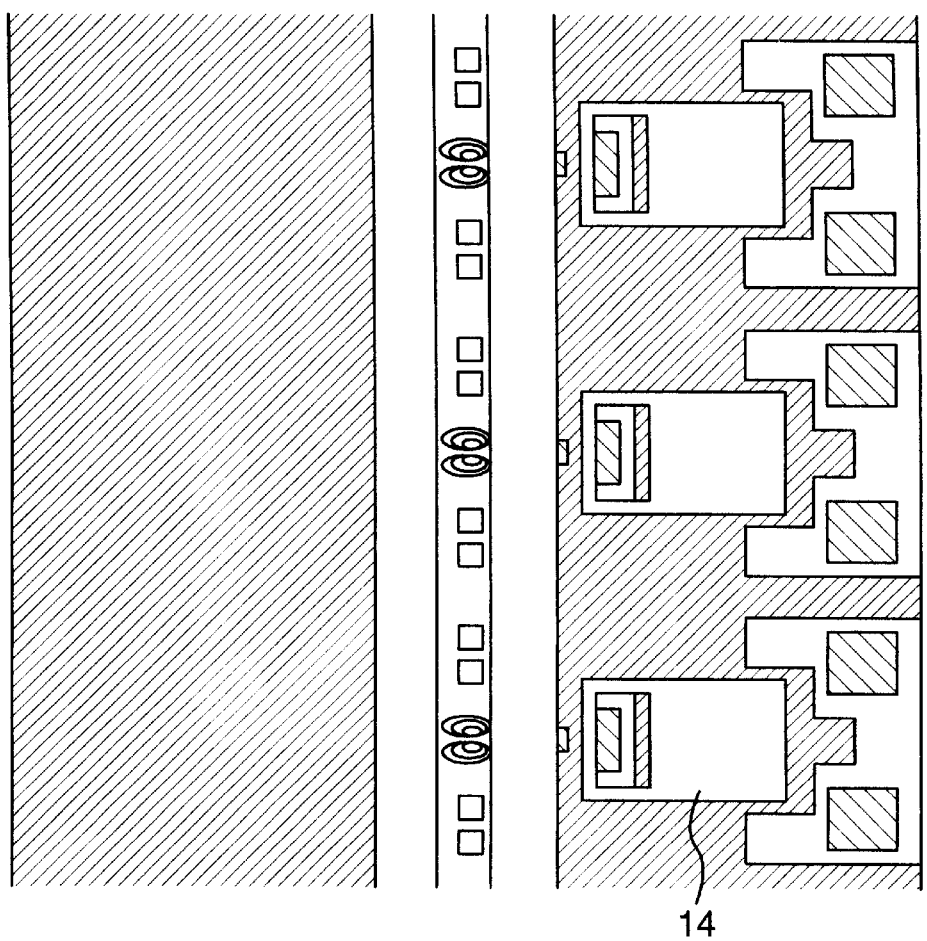
FIG. 9 shows views for explaining the process of fabricating the slider of FIG. 2.
Figure 9:
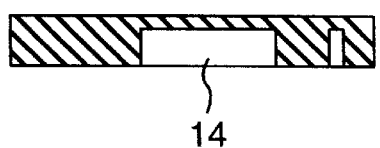

Next, dry etching is done to form deep grooves 14. The depth of the grooves is determined so as to maximize the displacement of a bimorph actuator made up of the base material and the piezoelectric film. For example, when the piezoelectric film is 0.08 mm thick and the bar 0.2 mm thick, it is appropriate to etch away by a thickness of 0.13–0.17 mm so that the remaining thickness will be 0.03–0.07 mm. FIG. 9 shows a front view, side view, rear view and section view of the bar formed with the deep grooves 14.

Figure 10:
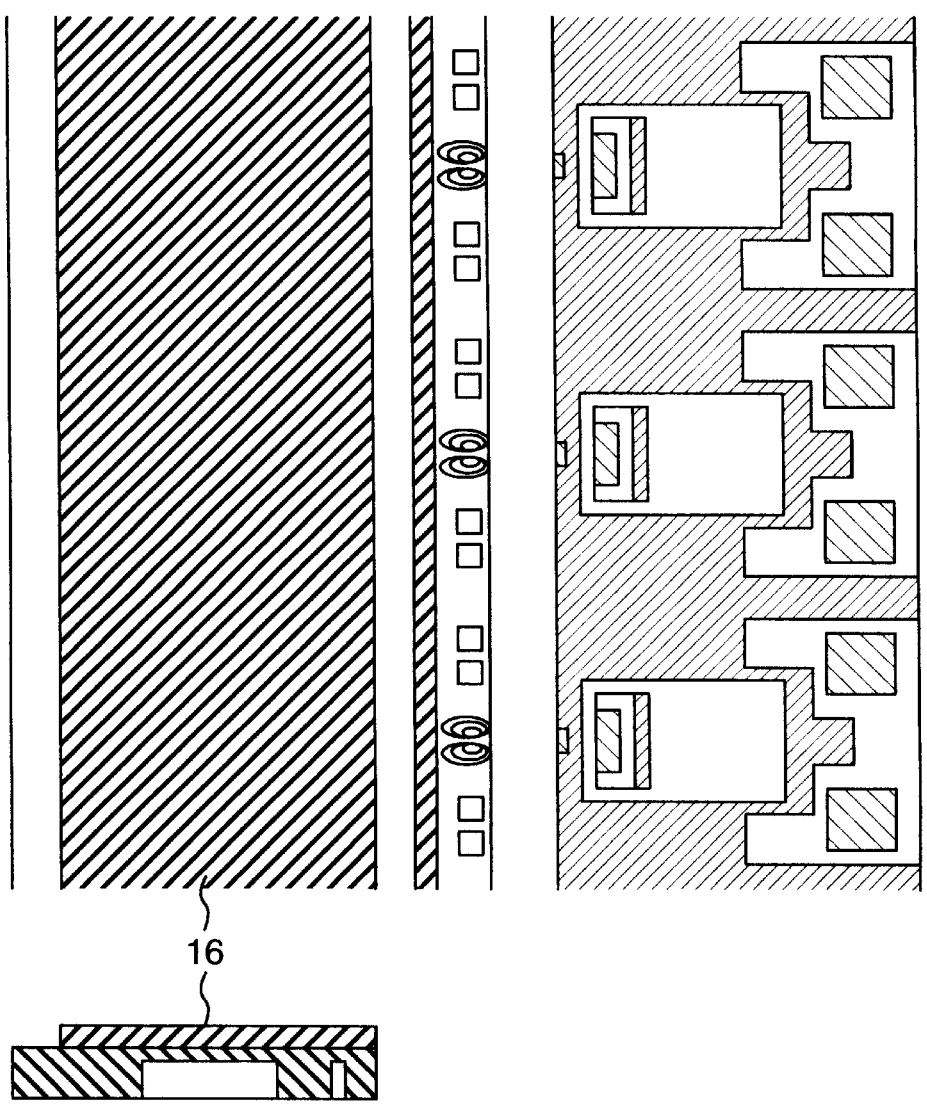
FIG. 10 shows views for explaining the process of fabricating the slider of FIG. 2.

Next, a bar 16 of a piezoelectric material as represented by a thin bar PZT is bonded, as shown in FIG. 10. It is preferred that a conductive film that serves as an electrode be formed, as by sputtering, on the surface of the base material to which the bar is to be bonded and on the both surfaces of the piezoelectric bar. Alternatively, a method may be employed, in which instead of bonding the bar 16, a piezoelectric thin film is formed on the rear surface as by sputtering.

Figure 11:
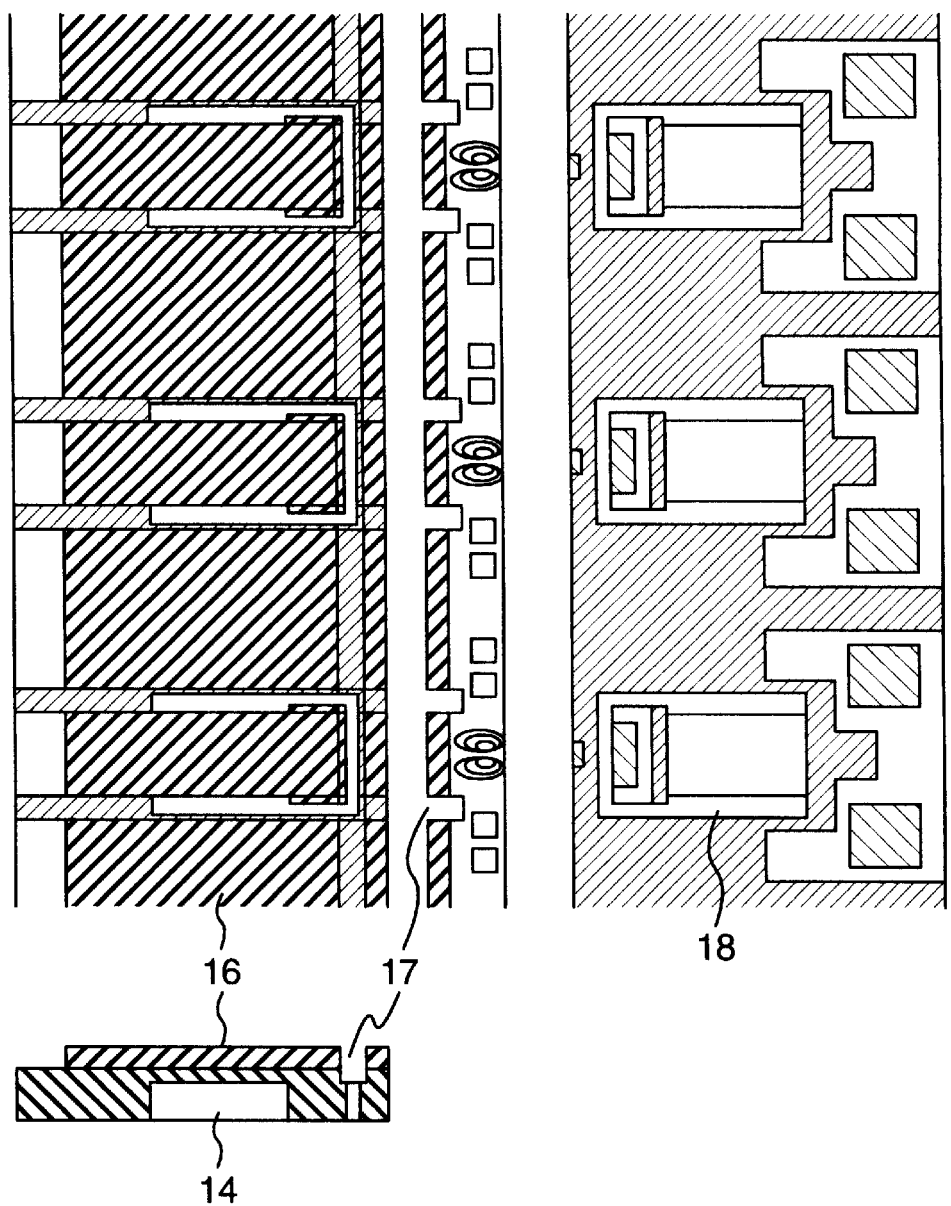
FIG. 11 shows views for explaining the process of fabricating the slider of FIG. 2.

Next, as shown in FIG. 11, a back groove 17 is formed by physical machining such as dicing, or dry etching. The depth of the back groove 17 is such that, where it overlaps the deep grooves 14, it reaches the deep grooves 14 to form through-holes 18.

As a final step, the wafer is cut into individual sliders by a physical machining such as dicing, or dry etching.

Figure 12:
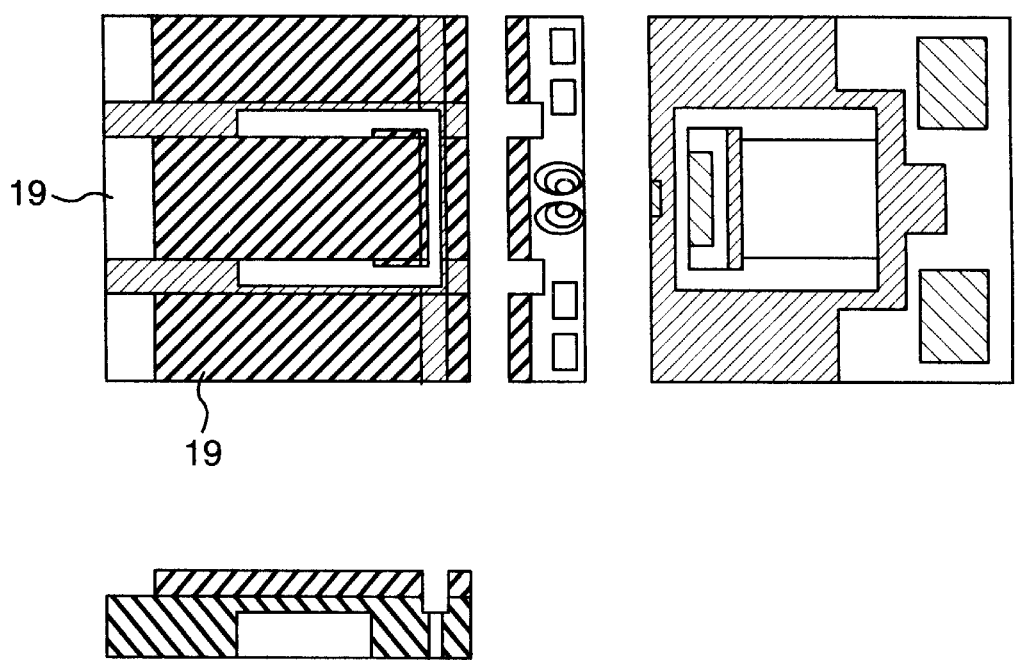
FIG. 12 shows views for explaining the process of fabricating the slider of FIG. 2.

A completed structure is shown in FIG. 12. Applying a voltage to two electrodes 19 shown in the figure expands or contracts the piezoelectric thin film, causing the central ABS pad to move in a direction perpendicular to the plane of the drawing by the bimorph effect.

The active head slider fabricating method described in this embodiment has the advantages that because the bonding and machining are done for relatively large dimensions, bonding is easy and can be carried out in large quantities, and therefore is suited for mass production.

The method of fabricating the three-pad type, movable pad type active head slider shown in FIG. 2 has been described. For the four-pad type active head slider shown in FIG. 6 or FIG. 7, the fabrication method is also applicable, which involves forming a two-layer structure made up of a base material bar and a piezoelectric material bar and then forming through-holes by removal processing from both surfaces to fabricate a micro-actuator structure.

With the slider structure of the invention in which the read/write element is not moved but the ABS pad is moved instead and in which the ABS pad is arranged nearer to the leading end than the read/write element, it is possible, under the condition that a read/write element and a wiring structure not significantly different from those currently used are employed, to realize an active head slider which can individually adjust the slider flying height. This makes it possible to eliminate the flying height margin for machining variations and other uncertainties and thereby reduce the flying height and magnetic spacing and realize a high recording density of the magnetic disk drive.

What is claimed is:

1. A magnetic disk drive comprising:
   at least one magnetic disk;
   a rotary mechanism for the magnetic disk;
   at least one slider having at least one first air-bearing surface pad attached thereon for flying near a surface of the magnetic disk with a predetermined gap therebetween due to a pneumatic bearing effect produced by the at least one first air-bearing surface pad;
   a read/write element mounted on a read/write mounting portion of the at least one slider;
   a supporting mechanism for supporting and positioning the at least one slider in a radial direction of the magnetic disk; and
   at least one movable portion provided on the at least one slider adjacent to the read/write element mounting portion, the at least one movable portion being separated by a cut from the read/write element mounting portion so that the at least one movable portion is movable relatively to the read/write element mounting portion while the read/write element mounting portion is stationary relatively to the at least one slider, the at least one movable portion having at least one second air-bearing surface pad attached thereto.

2. A magnetic disk drive according to claim 1, wherein the read/write element is positioned at a center of a trailing end portion of the at least one slider with respect to a disk rotation direction and the at least one movable portion is positioned at a central portion of the at least one slider in front of the read/write element mounting portion.

3. A magnetic disk drive according to claim 1, wherein the at least one slider has the read/write element mounted at a center of a trailing end portion thereof with respect to a disk rotation direction and has the at least one movable portion on both sides thereof in front of the read/write element, and each of the movable portions has at least one second air-bearing surface pad.

4. A magnetic disk drive according to claim 1, wherein the at least one slider has the read/write element mounted at a center of a trailing end portion thereof with respect to a disk rotation direction and has the at least one movable portion on both sides of the read/write element formed as movable beams whose free ends are deflectable, and each of the movable beams has a groove cut therein on a flying surface side thereof.

5. A magnetic disk drive according to claim 1, further comprising a drive mechanism mounted on the at least one slider to drive the at least one movable portion relatively to the read/write element mounting portion.

6. A magnetic disk drive according to claim 5, wherein the drive mechanism comprises a piezoelectric element.

7. A method of controlling a magnetic disk drive that causes at least one slider to fly near a surface of at least one magnetic disk with a predetermined gap therebetween due to a pneumatic bearing effect produced by an air flow, which is generated by a rotation of the magnetic disk and acts on at least one first air-bearing surface pad provided on the at least one slider, reads and writes information to and from the magnetic disk by a read/write element mounted on the at least one slider, the method comprising the steps of separating by cuts a center of a trailing end portion, with respect to a disk rotation direction, of the at least one slider from both side portions of the center, providing the read/write element to the center of the trailing end portion, providing a drive mechanism on each of the separated portions to drive the separated portions individually, and moving both the side portions relative to the center of the trailing end portion when performing read/write operations while the center of the trailing end portion remains stationary relatively to the at least one slider.

* * * * *